March 15, 1966  G. FERRARI  3,239,883
SCREW FOR EXTRUDERS
Filed Oct. 16, 1963
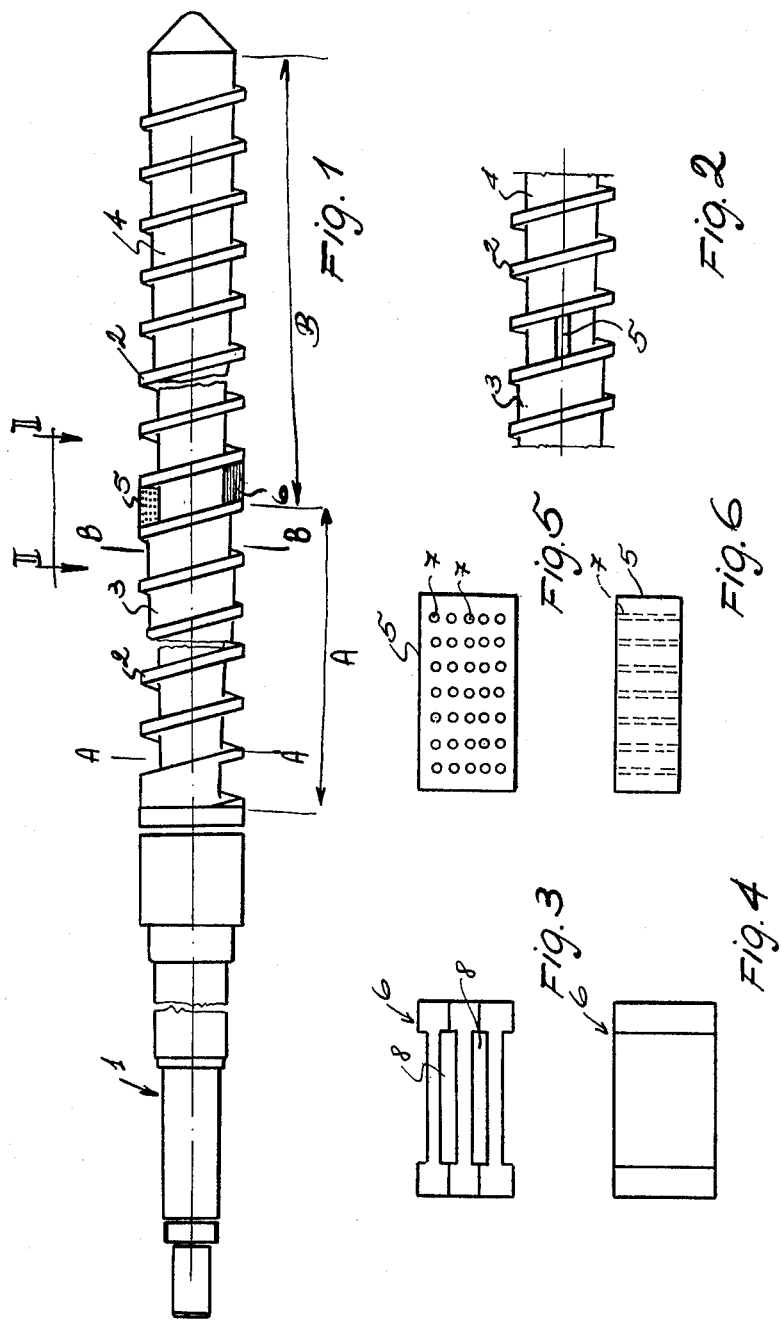
INVENTOR.
Giuseppe Ferrari
BY Michael J. Striker
Atty United States Patent Office 3,239,883
Patented Mar. 15, 1966

3,239,883
SCREW FOR EXTRUDERS
Giuseppe Ferrari, Via Canova 39, Milan, Italy
Filed Oct. 16, 1963, Ser. No. 316,677
Claims priority, application Italy Oct. 27, 1962,
Patent 677,337
4 Claims. (Cl. 18—12)

This invention relates to a screw or worm, adapted to be used on screw extruders for the extrusion of rubber and plastics through slot dies.

The conventional screws used on worm extruders for extruding rubber and plastics through slot dies or the like show a screw thread or channel helicoidally extending along a tapered core, which pinch diameter progressively increases from the feed hopper end to die end. The ratio between maximum diameter and minimum diameter is called: compression ratio.

The efficiency and volumetric rate of discharge (i.e. the output rate) are fundamentally influenced by the above factor.

The main purpose of this invention is the provision of a screw by which it is possible to obtain not only higher efficiencies and volumetric rates of discharge, but also a more thorough and better plasticizing and gelling of plastic materials which are to be extruded.

According to the invention, the above objects are obtained by a screw which is characterized in that it consists of a core having at least two zones, each having a different taper, i.e. such that in the first zone a compression ratio greater than that of second zone is obtained. The pitch of screw is always constant across said zones.

According to an important feature of the invention radial walls or baffles extending for the whole depth of worm channel are provided in the transition section between the two zones having a different compression ratio. Such walls are formed with openings, which may show a different shape and through which the plastic material is forced, which is thereby thoroughly mixed, plasticized, and gelled.

The invention will be better understood from the following detailed description of a preferred embodiment thereof illustrated on the accompanying drawing wherein:

FIG. 1 is a side elevation of a screw according to the invention;

FIG. 2 is a plan view of the transition section between the two screw zones, as seen in the direction of the arrow II—II of FIG. 1;

FIGS. 3 and 4 are an enlarged front elevation and an enlarged plan view of a first embodiment of a radial wall or baffle located in the transition section between the two screw zones;

FIGS. 5 and 6 show a side elevation and a plan view of another embodiment form of the radial wall or baffle, respectively.

Referring now to the drawings, the screw comprises a supporting and drive section 1, and an helicoidally grooved section, which is in turn subdivided into two zones A and B. The first zone A comprises a thread 2, which is helicoidally wound around a frustro conical core 3. The compression ratio is defined as the ratio between the diameter at the line B—B and the diameter at line A—A, said ratio being selected to be high in said zone A, for example 9/6.

The screw zone B shows also a spirally wound thread 2 having a pitch identical to that of the zone A; however the taper ratio of core is smaller than that of the former zone, whereby a proportionally lower compression ratio results. The compression ratio may be foi example 7/6. Two walls or baffles 5 and 6 radially extend from the core at the transition section between the high compression ratio zone A and the low compression ratio zone B, into the related spiral channel. In the embodiment shown in the drawing, said walls or baffles are located in a diametrally opposite relation, and show different shapes. However, more than two baffles even of similar shape might be provided in said section.

Referring again to the above embodiment it can be seen that the wall 5 consists of a metal plate, formed with a plurality of parallel ducts 7, through which the plastic material is forced, due to the pressure exerted thereon in the high compression ratio zone A.

Conversely, the wall of baffle 6, as shown in the FIGS. 3 and 4, is formed with a row of relatively large, superposed apertures or slits 8.

The plastic material coming from the extruder feed hopper (not shown) is fed into the screw barrel. Due to the rotation of screw said plastic material is urged along the screw channel toward the walls or baffles 5 and is forced through the orifices thereof, whereby a thorough mixing, plasticizing or gelling of same plastic material is obtained. The plastic material is thus transferred into the second zinc B, wherefrom it is conveyed along the screw channel towards the extruder barrel outlet.

While only one embodiment of the invention has been herein described, a person skilled in the art may readily conceive, in the light of the above teachings, many modifications and variations of the present invention, which will however fall within the purview of the appended claims.

Thus, for instance, the screw might show more than two zones with as many different compression ratios. The number of radial walls or baffles may be also increased and they might be located in more than one point along the screw.

What I claim is:

1. An extrusion screw for extruding rubber and plastic material through an extrusion die, said screw having a rear end and a free front end and being divided in at least two zones, one extending from the rear end to an intermediate section between said ends and the other from the intermediate section to said front end, each zone including a frusto-conical core having a small diameter closer to said rear end and a larger diameter closer to said front end, the ratio of the larger diameter to the smaller diameter of the zone between said rear end and said intermediate section being greater than the ratio of the larger diameter to the smaller diameter of the other section; a thread of uniform pitch and uniform outer diameter extending in a continuous spiral about the cores of said two zones; and at least one perforated baffle extending in axial direction between two successive turns of said thread and radially from the outer surface of the corresponding core, said baffle having an outer diameter equal to that of said thread.

2. An extrusion screw for extending rubber and plastic material through an extrusion die, said screw having a rear end and a free front end and being divided in at least two zones, one extending from the rear end to an intermediate section between said ends and the other from the intermediate section to said front end, each zone including a frusto-conical core having a small diameter closer to said rear end and a larger diameter closer to said front end, the ratio of the larger diameter to the smaller diameter of the zone between said rear end and said intermediate section being greater than the ratio of the larger diameter to the smaller diameter of the other section; a thread of uniform pitch and uniform outer diameter extending in a continuous spiral about the cores of said two zones; and at least two diametrically oppositely arranged perforated baffles each extending in axial direction between the last turn of said one zone and the first turn of said other zone and radially from the outer surface of the smaller diameter end of the core of the other zone, said baffles having an outer diameter equal to that of said thread.

3. An extrusion screw for extruding rubber and plastic material through an extrusion die, said screw having a rear end and a free front end and being divided in at least two zones, one extending from the rear end to an intermediate section between said ends and the other from the intermediate section to said front end, each zone including a frusto-conical core having a small diameter closer to said rear end and a larger diameter closer to said front end, the ratio of the larger diameter to the smaller diameter of the zone between said rear end and said intermediate section being greater than the ratio of the larger diameter to the smaller diameter of the other section; a thread of uniform pitch and uniform outer diameter extending in a continuous spiral about the cores of said two zones the outer surface of the smaller diameter end of the core of the other zone, said baffles having an outer diameter equal to that of said thread, the perforations of at least one of said baffles being formed by small bores therethrough substantially uniformly distributed over the whole surface of said baffle.

4. An extrusion screw for extruding rubber and plastic material through an extrusion die, said screw having a rear end and a free front end and being divided in at least two zones, one extending from the rear end to an intermediate section between said ends and the other from the intermediate section to said front end, each zone including a frusto-conical core having a small diameter closer to said rear end and a larger diameter closer to said front end, the ratio of the larger diameter to the smaller diameter of the zone between said rear end and said intermediate section being greater than the ratio of the larger diameter to the smaller diameter of the other section; a thread of uniform pitch and uniform outer diameter extending in a continuous spiral about the cores of said two zones; and at least two diametrically oppositely arranged perforated baffles each extending in axial direction between the last turn of said one zone and the first turn of said other zone and radially from the outer surface of the smaller diameter end of the core of the other zone, said baffles having an outer diameter equal to that of said thread, the perforations of at least one of said baffles being formed by a plurality of narrow slots therethrough extending susbtantially parallel to the axis of said screw.

References Cited by the Examiner

UNITED STATES PATENTS

| | | | |
|---|---|---|---|
| 2,872,703 | 2/1959 | Gambrill et al. | 18—12 |
| 2,928,130 | 3/1960 | Gray. | |
| 3,023,456 | 3/1962 | Palfey | 18—12 |
| 3,026,273 | 3/1962 | Engles | 18—12 |
| 3,078,514 | 2/1963 | Gray | 18—12 X |
| 3,115,674 | 12/1963 | Schrenk et al. | 25—14 X |
| 3,115,675 | 12/1963 | Tedder | 18—12 |
| 3,121,914 | 2/1964 | Olsen et al. | 18—12 |
| 3,123,860 | 3/1964 | Vesilund | 18—12 |

FOREIGN PATENTS

| | | |
|---|---|---|
| 1,251,409 | 12/1960 | France. |
| 582,838 | 10/1958 | Italy. |

WILLIAM J. STEPHENSON, *Primary Examiner.*

MICHAEL V. BRINDISI, *Examiner.*

L. S. SQUIRES, *Assistant Examiner.*